United States Patent [19]
Price et al.

[11] Patent Number: 5,823,657
[45] Date of Patent: Oct. 20, 1998

[54] LAMP CLAMP

[76] Inventors: Scott D. Price, 1154 Ridge Rd., Pylesville, Md. 21132; Alfred H. Judge, 20 La Costa Ct., Towson, Md. 21204; Thomas J. Wheeler, 418 E. Cross St., Baltimore, Md. 21230; Robert H. Gifford, 15 Bareylyn Dr., New Freedom, Pa. 17349

[21] Appl. No.: 694,785

[22] Filed: Aug. 9, 1996

[51] Int. Cl.[6] .............................. F21V 21/00; F21L 15/14
[52] U.S. Cl. ...................... 362/191; 362/190; 362/396; 362/419; 248/229.15
[58] Field of Search ................................. 362/190, 191, 362/396, 418, 419, 421; 248/229.15

[56] References Cited

U.S. PATENT DOCUMENTS

| | | | |
|---|---|---|---|
| 1,606,219 | 11/1926 | Havens | 362/418 |
| 2,711,872 | 6/1955 | Lampke | 248/229.15 |
| 2,885,538 | 5/1959 | Mahon et al. | 362/396 |
| 2,896,896 | 7/1959 | Revzin | 248/229.15 |
| 4,288,848 | 9/1981 | Fido . | |
| 4,661,895 | 4/1987 | Hull | 362/396 |
| 5,101,333 | 3/1992 | Glassford . | |
| 5,103,384 | 4/1992 | Drohan | 362/191 |
| 5,163,752 | 11/1992 | Copeland et al. . | |
| 5,209,562 | 5/1993 | Glassford . | |
| 5,276,596 | 1/1994 | Krenzel . | |
| 5,702,175 | 12/1997 | Chen | 362/191 |

FOREIGN PATENT DOCUMENTS 0546198  of 1922  France .

*Primary Examiner*—Thomas M. Sember
*Attorney, Agent, or Firm*—Charles E. Yocum; Dennis A. Dearing; John D. Del Ponti

[57] ABSTRACT

A lamp clamp uses a portion of the lamp as a moveable clamping jaw. This portion is screw-threaded into a threaded aperture of one of the arms of a C-shaped member. The other arm of the C-shaped member includes an object-engaging portion which further includes two pressure pads separated by a dished portion. The C-shaped member includes a coextensive flange around the inner periphery of the "C". The flange assists in stabilizing the clamp against the object, such as, the side edge of a worktable. The end of the moveable portion is attached to a swivel head which is pivotably engageable with the object in several orientations. The arrangement is especially useful when it is desired to mount a flashlight having a flexible stem (such as the Black & Decker® SnakeLight™ flashlight). The moveable clamping jaw defines a cylindrical tube into which is slideably mounted the graspable portion of the flashlight. Inasmuch as the graspable portion includes a tab member, an elongated groove is formed in the lamp-receiving receptacle moveable clamping jaw so that the tab may slideably and snugly engage the groove, and, accordingly, maintain a specific orientation relative to the worksurface. All of the component parts are made of plastic.

21 Claims, 3 Drawing Sheets

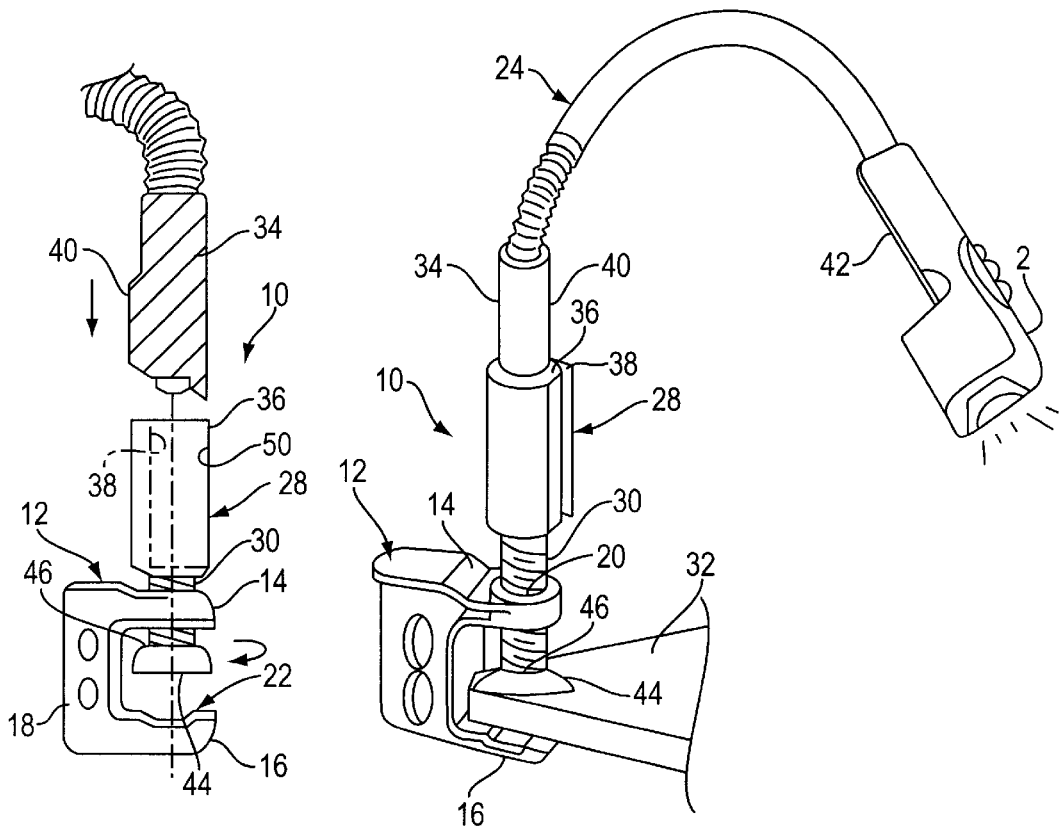
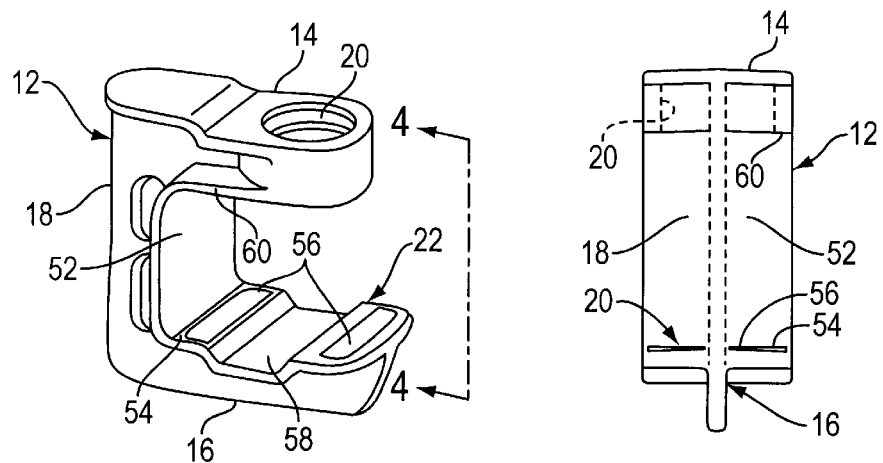
FIG. 1   FIG. 2
FIG. 3   FIG. 4

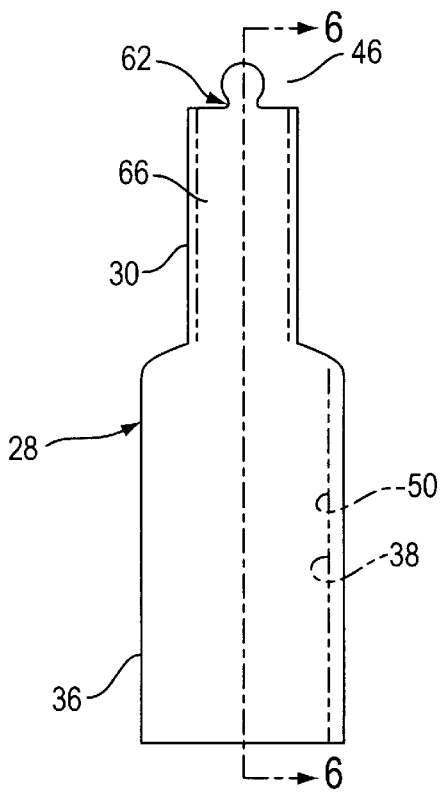
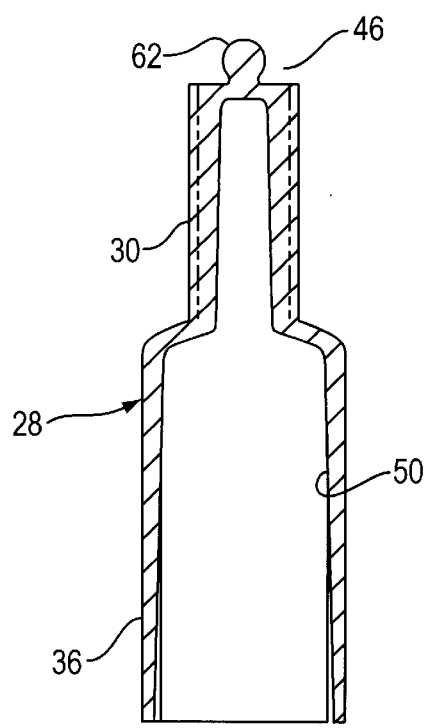
FIG. 5    FIG. 6
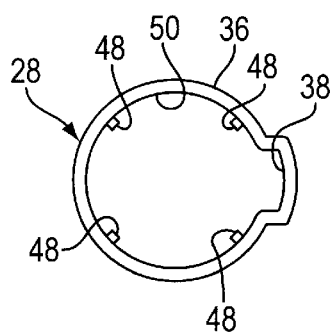
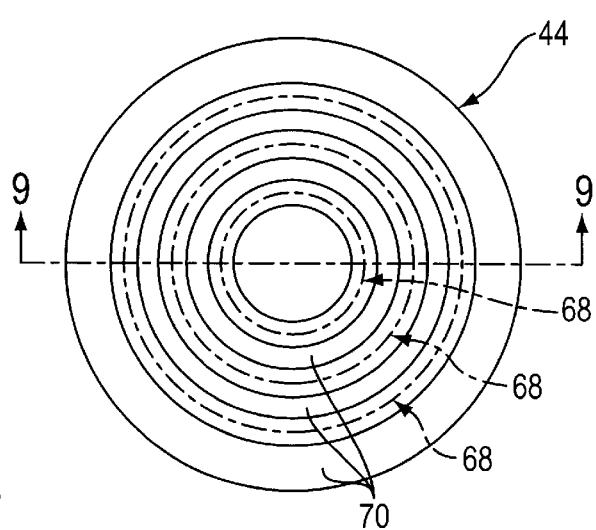
FIG. 7    FIG. 8
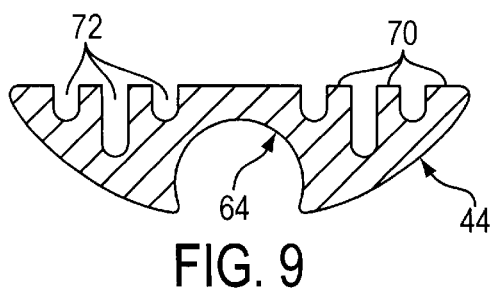
FIG. 9

5,823,657

LAMP CLAMP

FIELD OF THE INVENTION

The invention relates to clamps for mounting lamps onto objects, including without limitation tabletops, the tops of workbenches, workcenter superstructures and any other objects upon which a user will need to shed some light. The invention contemplates using a lamp support as a clamping jaw, thereby minimizing the complexity and the cost of the clamp.

BACKGROUND OF THE INVENTION

Various mounting arrangements for lamps and flashlights have been known over the years. One uses a flexible tube emanating from the middle of a handle of a pincer-type clamp. The other end of the tube is a light bulb and reflector, and is disclosed in U.S. Pat. No. 5,101,333 issued Mar. 31, 1992, to Glassford. Another reference is French Patent No. 546,198 published Nov. 2, 1922, to LeTourneur, which discloses a goose-neck light standard having one end which is inserted into a fixed backbone of a C-clamp. Another is disclosed in U.S. Pat. No. 5,276,596 issued Jan. 4, 1994, to Krenzel, in which one end of a flexible member is connected to a U-shaped cradle in which is nested the handle of a flashlight, and in which the other end may be inserted into a fixed clamping leg of a C-clamp. Yet another is shown in U.S. Pat. No. 4,288,842 issued Sep. 8, 1981, to Fido. This patent discloses a lamp having an elongated flexible support which is connected along one leg of a C-clamp. However, as is typically the case, the lamp is connected to the C-clamp as a separate adjunct to the conventional clamping jaws.

SUMMARY OF THE INVENTION

It is an object of the present invention to provide an apparatus for clamping a flexible flashlight, such as the SnakeLight™ flashlight sold by Black & Decker, to an object. Such an object can be without limitation a tabletop or the worktop of a workbench, or its superstructure such as is provided by a WORKMATE® workcenter also sold by Black & Decker, and shown for example in U.S. Pat. No. 4,159,821 issued Jul. 3, 1979 to Hickman, the disclosure of which patent is expressly incorporated by reference herein. It is a further object of the present invention to provide a simpler, less expensive but durable alternative to the conventional clamps noted above.

A feature by which the above objects may be attained is by providing a C-clamp which includes a C-shaped member defined by two opposing arms connected by a leg. One arm further defines a threaded through-hole and the other arm defines a object-engaging portion. A lamp having a light-emitting end and a threaded clamping end is threadedly inserted in the threaded through-hole for movement towards and away from the object-engaging portion to respectively clamp and unclamp an object.

Another feature by which the above objects may be attained is to provide the lamp clamping end with a flashlight receptacle removeably holding a flashlight handle, such as the power cell portion of the SnakeLight™ Flashlight. This holder is provided with male threads, which are inserted in the threaded through-hole of the clamping end.

The result is a clamp that enables the user to adjust the position of the light-emitting end of the flashlight in any number of orientations relative to the worksurface by using one end of the lamp (or lamp holder) itself as a clamping jaw. Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which like reference characters in the same or different Figures, indicate like parts:

FIG. 1 is an elevational schematic view of the lamp clamp of the present invention with the power cell portion of the SnakeLight™ flashlight poised for insertion therein;

FIG. 2 is a perspective schematic view of the lamp clamp of the present invention holding a flashlight with its light-emitting end at a selected orientation relative to the object to which it is clamped;

FIG. 3 is a perspective detail view of the C-shaped portion of the lamp clamp of the present invention;

FIG. 4 is an elevational detail view taken along the line 4—4 of FIG. 3;

FIG. 5 is an elevational detail view of one element of the moveable clamping jaw of the lamp clamp shown in FIG. 1;

FIG. 6 is an elevational sectional detail view taken along line 6—6 of FIG. 5;

FIG. 7 is an end view of the moveable clamping member, showing the register for the tab;

FIG. 8 is an enlarged detail plan view of the swivel head of the lamp clamp of the present invention; and FIG. 9 is an elevational sectional detail view taken along the line 9—9 of FIG. 8.

DETAILED DESCRIPTION OF THE PREFERRED EMBODIMENTS

Figure 10:
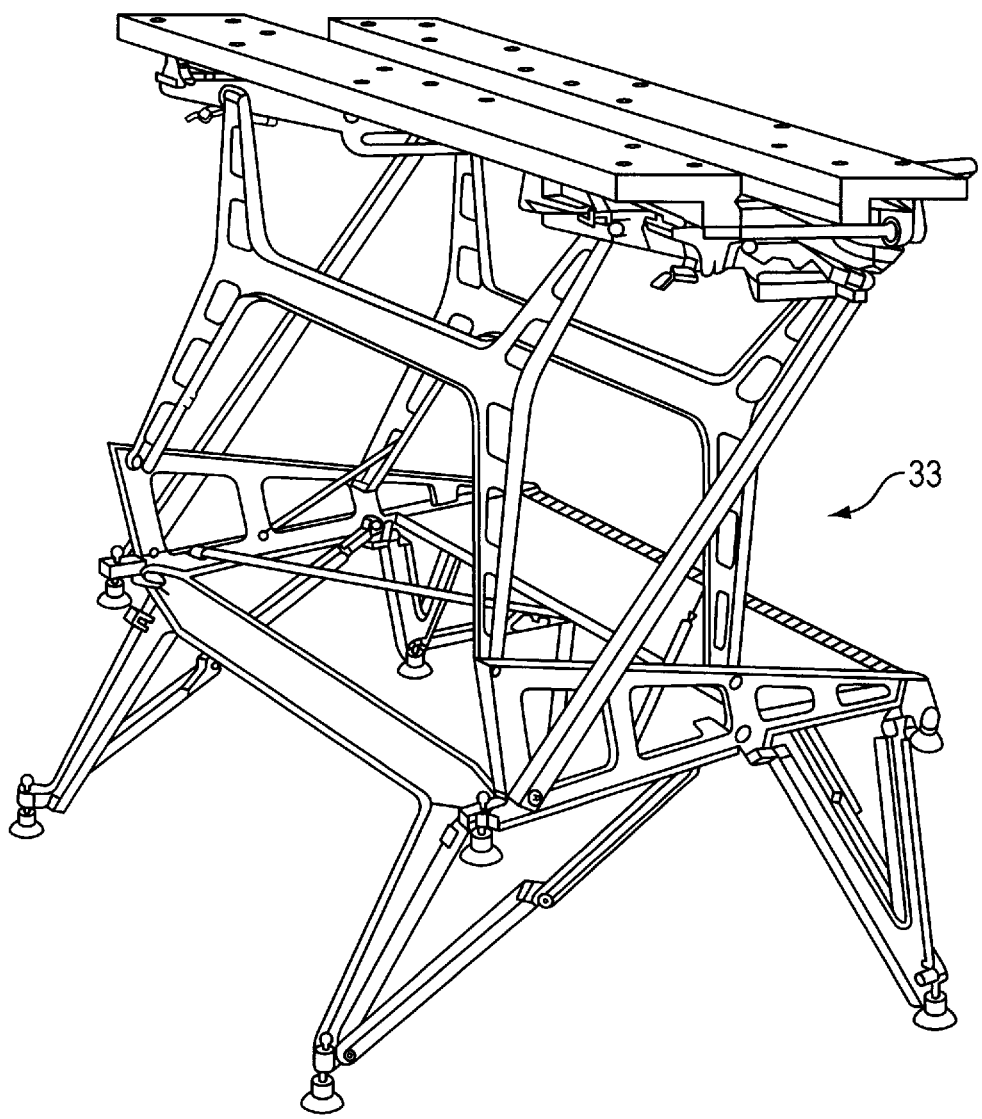
FIG. 10 is a perspective view of a work center.

Referring first to FIGS. 1 and 2, the lamp clamp of the present invention is referred to generally as 10. The lamp clamp 10 uses a C-clamp configuration having a C-shaped member 12 defined by two opposing arms 14, 16 connected by a leg 18. One arm 14 defines a threaded through-hole 20 and the other arm 16 defines an object-engaging or fixed clamping portion 22. A lamp 24 such as the Black & Decker® SnakeLight™ flashlight has a light-emitting end 26 and a moveable clamping end 28. The moveable clamping end 28 has a male threaded portion 30 received in the threaded through-hole 20 for movement towards and away from the object-engaging portion to clamp and unclamp an object, such as the worktable 32 shown in FIG. 2. This worktable 32 could include, for example, one of the jaws of the Black & Decker® WORKMATE® workcenter noted above, supported by a superstructure 33, as per example shown by FIG. 10.

In one preferred embodiment, the lamp clamping end 28 includes a portion of the flashlight, such as a handle or power cell portion 34, removeably connected to a flashlight receptacle 36. The lamp support or flashlight receptacle 36 in turn includes the threaded portion 30 which threadably engages the through-hole 20 of the arm 16. Preferably, the threaded portion 30 of the flashlight receptacle 36 is formed at one end of the flashlight receptacle and is axially aligned therewith. Also, the flashlight receptacle 36 is preferably hollow and generally cylindrical, and is adapted to slideably receive the power cell portion 34 of the SnakeLight™ flashlight 24 or, if desired, the handle or graspable portion of a conventional flashlight. As shown in FIGS. 2, 5 and 7, the flashlight receptacle 36 further defines a register slot 38 in which is slideably inserted a tab 40 formed on one side of the power cell portion 34, as the flashlight 24 is inserted into the receptacle. Tab 40 is mated with a tab receptacle 42 on the light-emitting end 26 so that the SnakeLight™ flashlight 24 may be stored in a compact position. If desired, two to four small bumps 44 can be formed in the inner wall 46 of receptacle 42 to assist in holding the lamp 24 (See FIG. 7).

Also, if desired, the lamp or flashlight 24 can be formed with a unitary threaded end to engage the through-hole 20 directly.

Preferably, a hemispherical swivel head 48 is pivotably mounted at an end 50 of the threaded portion 30 of the lamp or flashlight 24 receptacle 36. This maintains the handle of the flashlight in a predetermined orientation relative to the worksurface 32 or other object to which the lamp is clamped.

FIGS. 3 and 4 show the C-shaped member 12 in more detail. The leg 18 of the C-shaped member 12 has a first flanged portion 52 engageable with an object such as the worktable 32 shown in FIG. 2. The object-engaging portion 22 of the C-shaped member 12 includes a second flanged portion 54, also engageable with the object 32. The second flanged portion 54 preferably includes two pressure pads 56 separated by a dished portion 58.

This arrangement allows the clamp 10 to grip the metal superstructure of the workcenter, as well as round objects. Finally, arm 14 includes a third flanged portion 60. Note that the three flanged portions 52, 54, 60 are coextensive and extend along the interior of the "C" defined by the C-shaped member 12, the "C" thereby having a plate-like profile (see FIGS. 3 and 4).

Returning once again to the flashlight receptacle 36, and with reference to FIGS. 5, 6 and 7, detailed views are shown of the lamp or flashlight receptacle 36 having a ball 62 at one end that snaps into the ball-shaped recess 64 formed in the swivel head 48 (FIGS. 8 and 9). Threads are formed along the reduced diameter portion 66 of the moveable clamping member 28. Note that this member 28 may be formed as a one-piece, unitary plastic member. The same is true for the swivel head (FIGS. 8 and 9).

With further reference to FIGS. 8 and 9, note the series of annular grooves 68 and rings 70 shown in FIG. 8. These reduce the plastic needed for the swivel head 48.

In the preferred embodiment, the lamp or flashlight receptacle 36 and C-shaped member 12 are molded from ABS plastic, and the hemispherical swivel head 48 is molded from DuPont NYLON® plastic. However, one of ordinary skill in the art will appreciate that the lamp clamp 10 of the present invention can be made from any of several different materials.

In operation, the user simply places an open clamp 10 shown in FIG. 1 against an object 32 such that the lower or fixed clamping jaw 16 engages one side of the object, being for example a round member or the jaws or superstructure of a workbench or workcenter. Then the user simply rotates the lamp receptacle 28 which in turn screws the swivel head 48 into clamping engagement with the object. The swivel head 48 will pivot to engage irregularly-shaped objects.

The above-described embodiments, of course, are not to be construed as limiting the breadth of the present invention. Modifications and other alternative constructions will be apparent which are within the spirit and scope of the invention as defined in the appended claims.

What is claimed is:

1. A lamp holder for clamping to an object, comprising:
    (a) a fixed clamping jaw;
    (b) an opposed moveable clamping jaw defining a lamp support;
    (c) an arm defining a threaded portion and connected to and spaced from the fixed clamping jaw; and
    (d) the moveable clamping jaw having a threaded portion operatively engageable with the arm threaded portion for movement towards and away from the fixed clamping jaw to clamp and unclamp, respectively, the object.

2. The lamp holder claimed in claim 1, wherein the arm and fixed clamping jaw are connected by a transverse member to define a C-shaped member.

3. The lamp holder claimed in claim 1, wherein:
    (a) the lamp support is an elongated generally hollow member; and
    (b) the lamp support being axially aligned with the moveable clamping jaw threaded portion.

4. The lamp holder claimed in claim 3, wherein:
    (a) the fixed clamping jaw defining an object-engaging portion;
    (b) the object-engaging portion being so configured as to permit the lamp holder to be clamped to both planar and round surfaces.

5. A clamping lamp, comprising:
    (a) a lamp having a light emitter;
    (b) a moveable clamping jaw supporting the light-emitter and defining a threaded portion;
    (c) a fixed clamping jaw spaced from and in opposition to the moveable clamping jaw;
    (d) a threaded member extending from the fixed clamping jaw;
    (e) the moveable clamping jaw threaded portion engageable with the threaded member to advance and retract the moveable clamping jaw towards and away from the fixed clamping jaw, respectively;
    (f) whereby the light-emitter may be respectively clamped to and unclamped from, an object.

6. The clamping lamp claimed in claim 5, wherein:
    (a) the lamp includes a light-emitting portion at one end thereof and a graspable portion at another end thereof;
    (b) the moveable clamping jaw supporting the light emitter at the graspable portion.

7. The clamping lamp claimed in claim 6, wherein the graspable portion being removeably connected to the moveable clamping jaw.

8. The clamping lamp claimed in claim 7, wherein:
    (a) the graspable portion including a power cell;
    (b) the moveable clamping jaw defining a receptacle for receiving the graspable portion; and
    (c) the graspable portion being removeably insertable in the receptacle.

9. The clamping lamp claimed in claim 8, wherein the receptacle is axially aligned with the moveable clamping jaw threaded portion.

10. The clamping lamp claimed in claim 8, further comprising a flexible link connecting the grasping portion to the light-emitting portion, whereby the light-emitting portion may be oriented at any of several positions in relationship to the object when the graspable portion is inserted into the receptacle.

11. A C-clamp, comprising:
    (a) a C-shaped member defined by two opposing arms connected by a leg;
    (b) one arm defining a threaded through-hole and the other arm defining an object-engaging portion;

(c) a lamp having a light-emitting end and a threaded clamping end; and (d) the threaded clamping end being threadedly received in the threaded through-hole for movement towards and away from the object-engaging portion to clamp and unclamp, respectively, an object.

12. The C-clamp claimed in claim 11, wherein:

(a) the lamp clamping end including a flashlight receptacle removeably holding a flashlight;

(b) the flashlight receptacle including a threaded portion; and (c) the threaded portion threadedly engaging the threaded through-hole of the threaded clamping end.

13. The C-clamp claimed in claim 11, wherein:

(a) the flashlight receptacle threaded portion defining an end; and (b) the end defining a swiveling head swivelable about the end and engageable with the object.

14. The C-clamp claimed in claim 11, wherein:

(a) the leg of the C-shaped member having a first flanged portion engageable with the object; and (b) the object-engaging portion of the other arm including a second flanged portion engageable with the object.

15. The C-clamp claimed in claim 14, wherein the second flanged portion includes a pressure pad.

16. The C-clamp claimed in claim 14, wherein the second flanged portion includes two pressure pads separated by a dished portion.

17. The C-clamp claimed in claim 14, wherein:

(a) the one arm of the C-shaped member including a third flanged portion engageable with the object; and (b) the flanges of the first, second and third flanged portions being coextensive.

18. The C-clamp claimed in claim 11, wherein:

(a) the flashlight receptacle defining a bore having a longitudinal axis; and (b) the flashlight receptacle threaded portion being axially aligned with the bore axis.

19. An illuminatable workbench, comprising:

(a) a benchtop;

(b) a superstructure supporting the benchtop above a surface;

(c) a lamp having a threaded end;

(d) the threaded end engageable in a threaded arm of a C-shaped member;

(e) another arm of the C-shaped member forming a fixed clamping jaw and the threaded end defining a moveable clamping jaw;

(f) the fixed and moveable clamping jaws being configured to clamp any of the benchtop and the superstructure; whereby (g) the workbench may be illuminated at a predetermined location.

20. The illuminatable workbench claimed in claim 19, wherein:

(a) the benchtop being defined by clamping jaws having coplanar worksurfaces;

(b) the benchtop clamping jaws being moveable towards and away from one another; and (c) the clamping jaws further being moveable to any of a range of angular orientations relative to one another to thereby clamp irregularly-shaped workpieces.

21. The illuminatable workbench claimed in claim 19, wherein the superstructure is collapsible to permit carrying and storing the workbench.

* * * * *